(12) United States Patent
Hard et al.

(10) Patent No.: US 6,979,429 B2
(45) Date of Patent: Dec. 27, 2005

(54) METHOD FOR SOLUBILIZING METAL VALUES

(75) Inventors: Robert A Hard, Hollowell, ME (US); Patrick M. Brown, Exton, PA (US); James E. Reynolds, Denver, CO (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 10/288,240

(22) Filed: Nov. 5, 2002

(65) Prior Publication Data

US 2003/0170158 A1 Sep. 11, 2003

Related U.S. Application Data

(63) Continuation of application No. 08/622,698, filed on Mar. 26, 1996, now abandoned.

(51) Int. Cl.⁷ .................... C01G 33/00; C01G 35/00
(52) U.S. Cl. ........................................... 423/68
(58) Field of Search ............................ 423/68

(56) References Cited

U.S. PATENT DOCUMENTS

| | | |
|---|---|---|
| 2,767,047 A | 10/1956 | Wilhelm et al. |
| 2,953,453 A | 9/1960 | Foos |
| 2,962,372 A | 11/1960 | Foos |
| 3,117,833 A | 1/1964 | Pierret |
| 3,300,297 A | 1/1967 | Field |
| 3,658,511 A | 4/1972 | Gustison |
| 3,712,939 A | 1/1973 | Capps et al. |
| 3,972,710 A | 8/1976 | Meyer |
| 3,976,475 A | 8/1976 | Markland |
| 4,155,982 A | 5/1979 | Hunkin et al. |
| 4,164,417 A | 8/1979 | Gustison |
| 4,233,278 A | 11/1980 | Korchnak |
| 4,234,555 A | 11/1980 | Pulley et al. |
| 4,278,640 A | 7/1981 | Allen et al. |
| 4,293,528 A | 10/1981 | Paul |
| 4,309,389 A | 1/1982 | Meyer |
| 4,320,093 A | 3/1982 | Volesky et al. |
| 4,412,861 A | 11/1983 | Kreuzmann |
| 4,446,115 A | 5/1984 | Endo et al. |
| 4,446,116 A | 5/1984 | Krismer et al. |
| 4,451,438 A | 5/1984 | Floeter et al. |
| 4,477,416 A | 10/1984 | Goddard |
| 4,536,034 A | 8/1985 | Otto, Jr. et al. |
| 4,654,200 A | 3/1987 | Nirdosh et al. |
| 4,663,130 A | 5/1987 | Bergman et al. |
| 4,673,554 A | 6/1987 | Niwa et al. |
| 4,695,290 A | 9/1987 | Kindig et al. |
| 4,718,996 A | 1/1988 | Vanderpool et al. |
| 4,743,271 A | 5/1988 | Kindig et al. |
| 4,753,033 A | 6/1988 | Kindig |
| 4,778,663 A | 10/1988 | Rickelton |
| 4,808,384 A | 2/1989 | Vanderpool et al. |
| 4,923,507 A | 5/1990 | Silva |
| 5,023,059 A | 6/1991 | Bielecki et al. |
| 5,084,253 A | 1/1992 | Pollock et al. |
| 5,209,910 A | 5/1993 | Bludssus et al. |
| 5,273,725 A | 12/1993 | Carlson |
| 5,384,105 A | 1/1995 | Carlson |
| 5,437,848 A | 8/1995 | Hard |
| 5,492,680 A | 2/1996 | Odekirk |

FOREIGN PATENT DOCUMENTS

| | | |
|---|---|---|
| EP | 0 041 459 | 6/1981 |
| FR | 2 438 623 | 1/1980 |

OTHER PUBLICATIONS

PCT Application No. WO/90/02823, published Mar. 22, 1990.
PCT Application No. WO/95,13985, published May 26, 1995.
PCT International Appln. No. PCT/US97/04013 Search Report mailed Jul. 16, 1997.
PCT Application No. WO 94/01190, published Jan. 20, 1994.
PCT International Appln. No. PCT/US97/04089 Search Report mailed Aug. 12, 1997.
PCT International Appln. No. PCT/US97/04088 Search Report mailed Aug. 5, 1997.
"Extractive Metallurgy Of Niobium, Tantalum And Vanadium," by C.K. Gupta, pp. 405–444, 1984, no month, International Metals Reviews, vol. 29(6).
Solvent Extraction Principles and Applications to Process Metallurgy, Part II, no date.
Radioactive Waste Disposal in the Shiprock–Type Uranium Milling Flowsheet by K.E. Tame, E.G. Valdez, and J.B. Rosenbaum.
Radium Removal From Uranium Ores and Mill Tailings by S.R. Borrowman & P.T. Brooks, no date.
The Purification of Inorganic Acids by the Amine Liquid Ion Exchange Process by D.W. Agers, J.E. House, J.L. Drobnick & C.J. Lewis, no date.
Scandium Recovery From a Tantalum Waste Residue: A Status Report by D.D. Harbuck & G.R. Palmer, U.S. Bureau of Mines, no month, 1991.
Evaluation of Scandium Oxide Production from Tantulum Processing Waste, Aug. 1993, edited by G.Kyle Green.
*Scandium Saves Aluminum*, Rare–earth information Center Insight, Ames Laboratory Institute For Physical Research and Technology, vol. 6, No. 4, Apr. 1,1993.
*Co–extraction of uranium and thorium*, by G.M. Ritcey & B.H. Lucas, Apr. 1972, Journal of Metals, pp. 39–44.

*Primary Examiner*—Steven Bos (57) ABSTRACT

The processes of the present invention include mineral acid leaching of a metal containing material, such as an ore residue, containing fluoridated metal values in the presence of a complexing agent which will complex fluoride ions. The processes of the present invention provide for the separation of valuable metal, fluoride and radionuclide values from a feed material of high mineral content wherein the metals and radionuclides are present as substantially water insoluble fluorides or are trapped within a metal fluorine matrix which is substantially insoluble in typical chemical reactant systems.

13 Claims, 3 Drawing Sheets

METHOD FOR SOLUBILIZING METAL VALUES

STATEMENT OF RELATED APPLICATIONS

The present application is a continuation of and claims priority to U.S. non-provisional patent application Ser. No. 08/622,698 filed on Mar. 26, 1996, now abandoned.

FIELD OF THE INVENTION

The present invention relates to a method for solubilizing metal values from metal containing materials including ores, ore residues and slags. The method is particularly well-suited for use in solubilizing fluoridated metal values from ore residues containing tantalum and niobium.

BACKGROUND

The production of many commercially valuable metals, or metal compounds, from mineral ores includes a process step of digesting the ore with a mineral acid such as hydrofluoric acid. The digesting step is utilized to convert metal species in the mineral ore to metal species which are soluble in aqueous systems so that the metal values may be separated out by selective extractions or the like.

In a typical process, mineral ore concentrates containing tantalum and niobium are conventionally decomposed with hydrofluoric acid (HF) or mixtures of hydrofluoric acid and sulfuric acid ($HF/H_2SO_4$). The tantalum and niobium heptafluoro complexes formed are then separated and purified by solvent extraction.

More particularly, in a conventional process for producing tantalum pentoxide ($Ta_2O_5$), the tantalum fraction from the ore decomposition is stripped into the aqueous phase and tantalum pentoxide is precipitated using ammonia and recovered by filtration. Niobium pentoxide may be produced in a similar fashion.

Commercial schemes for the extraction and separation of tantalum and niobium values from beneficiated ores or from tin slags are described in detail in U.S. Pat. Nos. 2,767,047; 2,953,453; 2,962,372; 3,117,833; 3,300,297; 3,658,511; 3,712,939 and 4,164,417. A general discussion of other ore process schemes is found in Extractive Metallurgy of Niobium, Tantalum and Vanadium, INTERNATIONAL METALS REVIEW, 1984, VOL. 29, NO. 26, BB 405–444 published by The Metals Society (London) and in The Encyclopedia of Chemical Technology, 3rd Ed., Vol. 22 pp. 547–550.

The processes described above, and in particular the tantalum/niobium production processes, produce digested ore residues which include a number of different metal values including tantalum and niobium. U.S. Pat. No. 5,384,105 relates to a process for recovering tantalum/niobium residues from highly fluorinated ore materials by contacting the materials with a mineral acid mixture which includes boric acid ($H_3BO_3$).

The process of the present invention provides a means for solubilizing metal values from ore residues, such as the ore residues produced by a conventional tantalum/niobium oxide production process to permit separation and recovery of various metal values prior to further processing of the ore residues.

SUMMARY OF THE INVENTION

According to the present invention there is provided a process for solubilizing metal values from metal containing materials including metal or metal compounds, ores, ore residues and slags which comprise fluoridated metal values. The process comprises:

contacting the metal containing material with a mineral acid and a complexing agent to digest the ore residue under temperature and pressure conditions suitable to form a (complexing agent)/(fluoride) complex and solubilize at least a portion of at least one metal value present in the ore residue; and separating the resulting solids and solubilization solution. The process of the present invention allows solubilization of otherwise insoluble metal values. The process of the present invention has the additional benefit of further concentrating metal values, such as tin, which are not solubilized.

The term "metal" is used herein in a manner consistent with its definition to those of ordinary skill in the art and refers to an element that forms positive ions when its compounds are in solution "Metal" includes alkali metals, alkaline-earth metals, transition metals, noble metals, platinum metals, rare metals, rare-earth metals, actinide metals, light metals and heavy metals.

An advantage of the process of the present invention is that the process separates the solubilizable metal values of an ore residue from the insoluble metal values of the ore residue, and in particular permits selective separation of tantalum and niobium values.

Another advantage of the process of the present invention is that the process produces an ore residue product with an increased percentage, by weight, of tantalum and/or niobium metal values and/or other unsolubilized metal values.

A further advantage of the process of the present invention is that the process produces an ore residue product with reduced amounts of solubilizable radioactive metal values.

A still further advantage of the process of the present invention is that the ore residue product produced by the process may be further processed to recover valuable metal compounds.

A still further advantage of the process of the present invention is that the solubilization solution produced by the process may be further processed to separate and recover the solubilized metal values.

A still further advantage of the process of the present invention is that the process may be utilized to separate metal-fluoride complexes from tantalum and/or niobium metal values.

A still further advantage of the process of the present invention is that the complexing agent may generally be separated and recovered/recycled from the solubilization solution.

Yet another advantage of the process of the present invention is that the process may be utilized to concentrate tin values present in a starting metal containing material which includes tin.

Other advantages of the present invention will become apparent from the following more detailed description.

DETAILED DESCRIPTION OF THE INVENTION

The processes of the present invention include mineral acid leaching of metal containing material, preferably an ore residue containing fluoridated metal values in the presence of a complexing agent which will complex fluoride ions. The processes of the present invention provide for the separation of metal, fluoride and radionuclide values from a feed material of high mineral content wherein the metals and radionuclides are present as substantially water insoluble fluorides or are trapped within a metal fluorine matrix which is generally substantially insoluble in many reactant systems.

According to the present invention, a process for solubilizing metal values from a metal containing material, such as an ore residue, comprising fluoridated metal values comprises:

contacting the ore residue with a mineral acid and a complexing agent under temperature and pressure conditions suitable to complex insoluble fluorides and to solubilize at least a portion of at least one metal value present in the ore residue; and separating the resulting ore residue and solubilization solution.

When utilized with a tin containing starting material, the process of the present invention may be advantageously utilized in a process to recover tin metal values. According to the present invention, a process for recovering tin metal values from a tin containing starting material comprises: contacting the tin containing starting material with a mineral acid and a complexing agent under temperature and pressure conditions suitable to complex insoluble fluorides and to solubilize at least a portion of the metal value other than tin present in the ore residue; and separating the resulting tin containing material and solubilization solution. Tin concentration of the tin containing starting material, or further tin concentration of the tin containing material produced by the process of the present invention, may be obtained by physical separation techniques known in the art such as density separation by Deister table, Humphrey spiral, jigging and/or flotation. Concentration of the tin containing starting material, before and/or after undertaking the process of the present invention will generally further increase the tin concentration of the tin containing material produced by the process.

The process of the present invention is explained in more detail in the following paragraphs.

The starting material for the process of the present invention is metal containing material comprising metal values. Preferably, the metal containing material is an ore residue comprising fluoridated metal values, such as the ore residue resulting from a conventional tantalum pentoxide/niobium pentoxide production process. As used herein a "fluoridated metal value" refers to a compound comprising at least one metal ion and at least one fluoride ion. Fluoridated metal values found in ore residues include, but are not limited to, tantalum (Ta), niobium (Nb), calcium (Ca), aluminum (Al), iron (Fe), titanium (Ti), zirconium (Zr), chromium (Cr), lead (Pb), uranium (U), thorium (Th), barium (Ba), tin (Sn), magnesium (Mg), scandium (Sc), Yttrium (Y) and arsenic (As) which are found in the following compounds/complexes: $ThF_4$, $TaOF_3$, $NbOF_3$, $CaF_2$, $UF_4$, $BaF_2$, $ScF_3$, $YF_3$, $SiF_2$, $SnO_2$, $AlF_3$, $FeF_2$, $TiO_2$, $ZrF_4$, $CrF_{3 \, or \, 5}$, $PbF_2$, $MgF_2 AsF_{3 \, or \, 5}$.

In the process of the present invention, the starting material (an ore residue comprising a fluoridated metal which may also contain tantalum and/or niobium metal values) is contacted with an aqueous solution of mineral acid and complexing agent. Suitable mineral acids include nitric acid ($HNO_3$), sulfuric acid ($H_2SO_4$) and hydrochloric acid (HCl). The choice of mineral acid will depend on several factors including, the chemical composition of the starting ore residues, the type of separation system to be used in the process and/or in downstream processing of the leach liquid, and the recovery cost of the metal values desired to be recovered. For example, if it is desired to separate and recover uranium metal values from the leach liquid, sulfuric acid might be utilized as the mineral acid because sulfuric acid will form a soluble salt with uranium, and sulfuric acid is relatively low in cost and compatible with many commonly utilized extraction techniques. If, on the other hand, it is desired to separate and recover radium metal values from the leach liquid, sulfuric acid would be a less desirable choice because of the insolubility of radium in sulfate systems. Therefore, hydrochloric acid or nitric acid would be a more desirable choice where it is desired to recover radium metal values from the leach liquid.

Suitable complexing agents include those having a strong affinity for the fluoride ion which include, but are not limited to, aluminum, silicon, titanium and mixtures thereof. The complexing agent may be added as part of a compound including, but not limited to, aluminum hydroxide, calcined clay, aluminum chloride, aluminum nitrate, aluminum sulfate and alum. The use of titanium as a complexing agent, for example in the form of ilmenite or $TiO_2$ is generally effective when $CaF_2$ is a principal source of solid phase fluoride. When $AlF_3$ is a principal source of solid phase fluoride, the use of an aluminum containing complexing agent is generally preferred.

Preferably the amount of complexing agent utilized is an amount such that the molar amount of complexing agent is related to the molar content of the starting material according to the following formula:

$$\frac{\text{Moles of complexing agent}}{\text{Moles fluoride in the starting material}} = 0.2 \text{ to } 1.5, \text{ preferably } 0.5 \text{ to } 0.9.$$

The moles of complexing agent in the formula refers to the elemental form of the complexing agent, i.e. aluminum, silicon etc. For example, in the case of the complexing agent aluminum, introduced as aluminum hydroxide, the molar amount of complexing agent added is determined according to the following formula:

$$\frac{1/2[(\text{Moles } Al_2O_3) \text{ or Moles } Al(OH)_3]}{\text{Moles fluoride in the starting material}} =$$

$$0.2 \text{ to } 1.5, \text{ preferably } 0.5 \text{ to } 0.9$$

The moles of fluoride in the starting material may be determined and/or approximated by assaying the material, and/or by performing a mineral balance utilizing known techniques.

The amount of acid utilized is dependent upon the form of the complexing agent utilized and thus, in turn, related to the oxide content of the starting material. The amount of hydrogen ion supplied by the acid should be sufficient to react with the combined oxygen in the system after addition of the complexing agent. For example, in the case of the complexing agent aluminum, introduced as alumina ($Al_2O_3$) the amount of hydrogen ion supplied to the system by the acid should be sufficient to react with substantially all of the oxygen released by the decomposition of the alumina. Typically, 0.1 lb. to 2.0 lbs. (0.05 kg to 1 kg) of acid are utilized per pound (0.45 kg) of dried starting material.

The acid, complexing agent and starting material are suspended in water and digested at elevated temperatures at a range of 5 to 40% solids, preferably 5 to 30% solids, more preferably 10 to 20% solids, by weight. Preferably, the mixture is agitated in an amount sufficient to maintain substantially all of the solids in suspension.

The solids are digested until at least a portion of one solubilizable metal values is solubilized, preferably until a majority of the solubilizable metal values present in the starting material are solubilized. Preferably, the mixture is maintained at a temperature of 40 to 110° C., preferably 80 to 95° C. for a time period of 0.25 hours to 4.0 hours, preferably 1.0 to 3.0 hours. The process may be conducted at ambient pressure, i.e between 730 and 770 mm/Hg (millimeters/mercury) depending on the altitude where the process is practiced.

While not wishing to be bound by any theory, it is believed the reactions occurring during the digestion in the case where the complexing agent is introduced as alumina ($Al_2O_3$) and solubilized metal ("Sol.M") represents a solubilizable metal value may be broadly generalized as follows:

General Solubilizing Reaction $$(Sol.M)_xF_y+Al_2O_3+6HCl <=> 3H_2O+(Sol.M)_xCl_z+2AlF_{y/2}Cl_{(6-z)/2}$$

where $H_2O$; $(Sol.M)_xCl_z$; and $AlF_{y/2}Cl_{(6-z)/2}$ are in solution, and x, y and z are integers.

Complexing Reaction Component $$(Sol.M)_xF_y+2AlCl_3 <=> (Sol.M)_xCl_z+2AlF_yCl_{(6-z)/2}$$

where ($AlCl_3$) is formed by the following reaction in the digestion solution:

$$Al_2O_3+6HCl <=> 3H_2O+2AlCl_3$$

Thus, for example, the following reaction occurs with respect to the solubilizable alkaline-earth metal element calcium (Ca):

General Solubilizing Reaction for Ca $$CaF_2+Al_2O_3+6HCl <=> 3H_2O+CaCl_2+2AlFCl_2$$

Complexing Reaction Component for Ca $$CaF_2+2AlCl_3 <=> CaCl_2+2AlFCl_2$$

in more detail:

$$CaF_2+2Al^{+++} <=> Ca^{++}+2AlF^{++}$$

For insoluble metal values the general reaction is believed to be as follows, where "Insol.M" represents the insolubilizable metal value, the complexing agent is introduced as alumina ($Al_2O_3$) and the mineral acid is hydrochloric acid (HCl):

General Reaction for Insolubilizable Metal Value $$H_a(Insol.M)_bF_c+c(AlCl_3)+d(H_2O) <=> b/2((Insol.M)_{2b}O_{2d})+c(AlFCl_2)+c(HCl)$$

where $b/2((Insol.M)_{2b}O_{2d})$ is insoluble; $c(AlFCl_2)$ and $c(HCl)$ are in solution; a, b, c and d are integers; and where ($AlCl_3$) is formed by the reaction shown above. Thus, for example, the following reaction occurs with respect to the insolubilizable metal element Tantalum (Ta):

$$H_2TaF_7+7AlCl_3+2.5H_2O <=> \tfrac{1}{2}Ta_2O_5+7AlFCl_2+7HCl.$$

Reactions similar to the foregoing are believed to be occurring in the digesting solution for other solubilizable metal values and other insolubilizable metal values.

The relative ability to solubilize particular elements in the practice of the process of the present invention relates, in part, to the free energy of reaction to form an aluminum flouride $AlF^{++}$ complex according to the following general reactions:

$$(1/x)MF_x+Al^{3+}=AlF^{++}+M^{x(+)} \qquad I$$

$$(1/7)TaF_7^{--}+Al^{3+}+(2.5/7)H_2O=(0.5/7)Ta_2O_5+AlF^{++}+(5/7)H^+ \qquad II$$

The free energy of reaction for various fluoride compounds may be estimated as follows:

| Fluoride Compound | Free Energy of Reaction Calories/gram mol of $F^-$ to form $AlF^{++}$ |
|---|---|
| $ThF_4$ | −6566 |
| $TaF_7^{--}$ | −4366 |
| $NbF_7^{--}$ | −4300 |
| $CaF_2$ | −4203 |
| $UF_4$ | −1946 |
| $BaF_2$ | −1880 |
| $ScF_3$ | −1660 |
| $YF_3$ | −411 |

The more negative, the greater is the driving force to complex the fluoride with aluminum. If the free energy of reaction becomes positive, the aluminum fluoride complexing reaction will not proceed. As shown above, the free energy of reaction of yttrium fluoride is relatively low, nevertheless the process of the present invention may be advantageously utilized to separate yttrium fluoride from tantalum or niobium oxides.

After digestion for the selected time period, the digested slurry undergoes a liquid/solid separation step, which generates a liquid fraction (leach liquid) and a solids fraction. Suitable liquid/solid separation techniques for use in the process of the present invention include, but are not limited to: filtration, centrifugation and counter-current decantation. The liquid fraction comprises solubilized metal values, which may be separated and recovered by techniques known to those of ordinary skill in the art. Where the starting ore residue material includes fluoridated tantalum and niobium values, the solids fraction from the digestion will have enriched tantalum and niobium content, which may be subjected to further processing to recover these elements.

Figure 1:
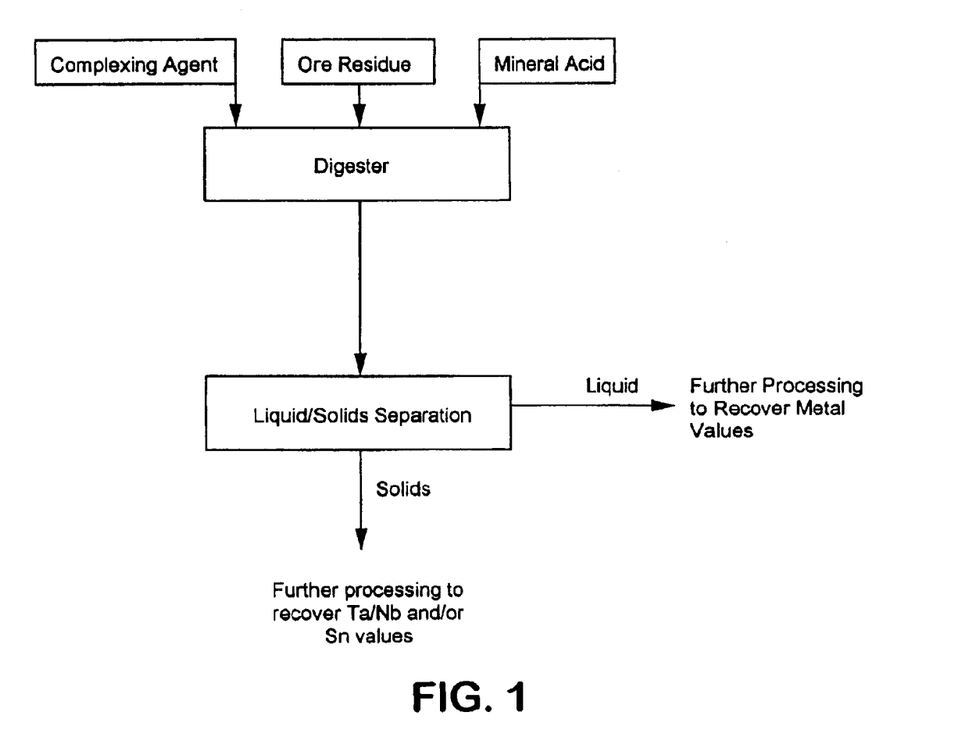
FIG. 1 is a schematic flow diagram of one embodiment of the present invention.

The process of the present invention may be understood in further detail with reference to the Figures. FIG. 1 provides a schematic diagram of an embodiment of the process of the present invention. As discussed above, and depicted in FIG. 1, in the process of the present invention ore residue, mineral acid and a complexing agent are combined in a digester, with the addition of water as necessary, to create a solution having a solids content of 5 to 40% solids, preferably 5 to 30% solids, more preferably 10 to 20% solids, by weight. The mixture is agitated in the digestion in an amount sufficient to maintain substantially all of the solids in suspension and maintained at a temperature of 40 to 110° C., preferably 80 to 95° C. for a time period of 0.25 hours to 4.0 hours, preferably 1.0 to 3.0 hours. After digestion for the desired time period, a liquid/solids separation step is performed to separate the liquid and solid fractions, which each may undergo further processing to recover commercially valuable components.

In an alternative embodiment of the present invention, before or after digestion, a physical separation step or steps may be performed utilizing physical separation techniques to separate particles of different physical properties, such as size and/or density. The physical separation step(s) may advantageously increase concentration of tantalum and niobium values in the subsequently recovered solids. The physical separation techniques include those known in the art, such as wet screening, tabling, jigging, gravity spiral, magnetic methods, and electrostatic heavy media methods, conventionally utilized to separate solids on the basis of density, size and/or other properties. After physical separation, the remaining slurry may be subjected to conventional liquid solid separation, such as thickening and filtration, followed by thorough wash of residue to yield clean fractions.

In an embodiment of the process of the present invention which utilizes a physical separation step, ore residue, mineral acid and a complexing agent are combined in a digester, with the addition of water as necessary, to create a solution having a solids content of 5 to 40% solids, preferably 5 to 30% solids, more preferably 10 to 20% solids, by weight. The mixture is agitated in the digestion in an amount sufficient to maintain substantially all of the solids in suspension and maintained at a temperature of 40 to 110° C., preferably 80 to 95° C. for a time period of 0.25 hours to 4.0 hours, preferably 1.0 to 3.0 hours. After digestion for the desired time period, a physical separation step is performed on the digested mixture to separate particles of different physical properties, such as size and/or density, and produce at least two resultant slurries. A liquid/solids separation step is performed on each of the resultant slurries to separate the liquid and solid fractions. If desired, the resulting liquid fractions may be combined and undergo further processing to recover commercially valuable components. The solid fractions resulting from the liquid/solids separation step may also undergo further processing. In particular, one of the resulting solids fraction may contain Ta/Nb values at a higher concentration than that produced by the process depicted in FIG. 1, rendering this solids fraction particularly desirable for further processing to recover Ta/Nb values.

In an alternative process, the physical separation step could preceed the initial digestion step. The preliminary physical separation step could be utilized to separate a fraction of the starting ore residue, or other metal containing material, which could be further processed to recover metal values. For example, an ore residue comprising tin, niobium and tantalum metal values could be subjected to a preliminary physical separation step to produce two fractions: a tin rich, tantalum/niobium poor fraction; and a tin poor, tantalum/niobium rich fraction. The tin poor, tantalum/niobium rich fraction could be further digested and processed according to the process of the present invention to further concentrate the tantalum and/or niobium metal values. The tin rich, tantalum/niobium poor fraction could be further processed, utilizing the process of the present invention or other techniques, to further concentrate the tin.

Figure 2:
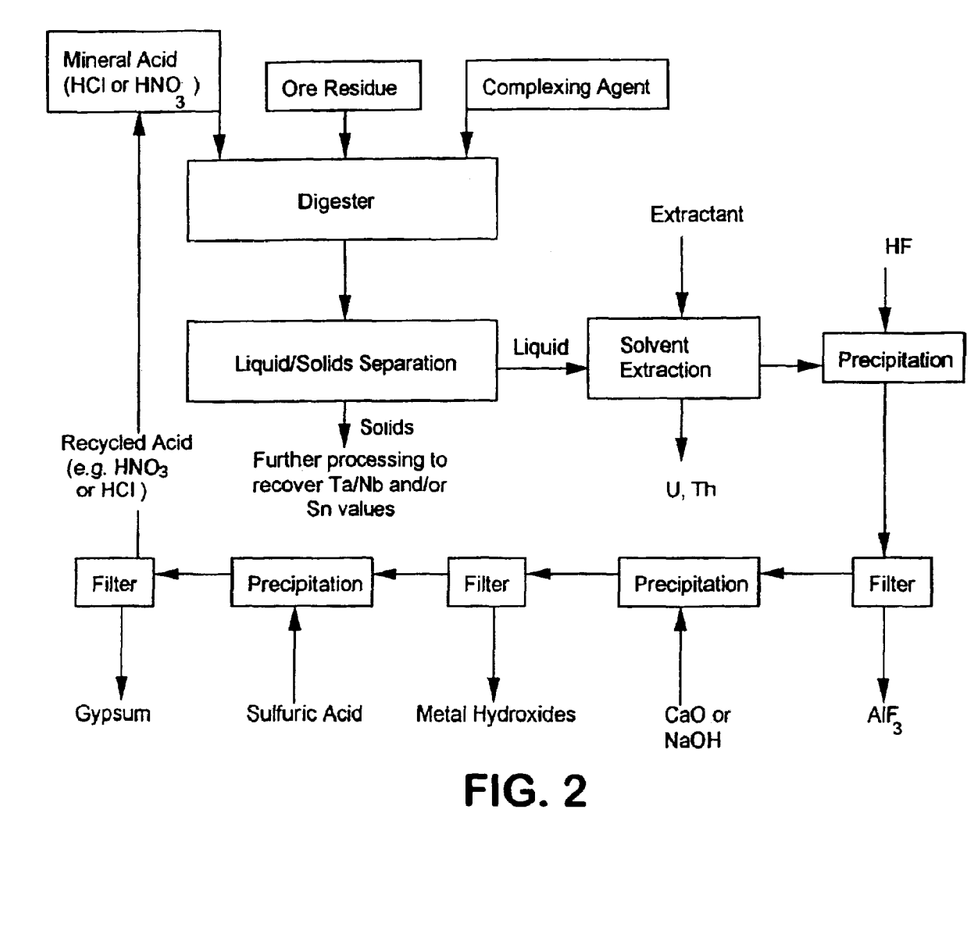
FIG. 2 is a schematic flow diagram of another embodiment of the present invention.

FIG. 2 provides a schematic diagram of a process of the present invention which includes processing steps for recovery of the complexing agent. The processing steps are provided by way of the example and should not be construed to limit the scope of the present invention. In particular, further processing of the solid and liquid fractions resulting from the process of the present invention (e.g. the process shown in FIG. 1) may be performed in any manner, and more particularly in manners well known to those of ordinary skill in the art.

As shown in FIG. 2, after liquid/solid separation, metal values may be extracted from the leach liquid by liquid/liquid extraction. The resulting solution may be contacted with hydrofluoric acid (HF) to precipitate aluminum fluoride solids ($AlF_3$) which may be separated by filtration and recovered. The resulting solution may be limed (contacted with calcium oxide (CaO) or sodium hydroxide (NaOH)) to precipitate metal hydroxides which may be separated by filtration and recovered. The resulting solution may be contacted with sulfuric acid ($H_2SO_4$) to precipitate gypsum ($CaSO_4.2H_2O$) and regenerate nitric acid ($HNO_3$). The gypsum may be separated by filtration and recovered, and the nitric acid solution may be recycled into the mineral acid solution utilized in the initial digestion of the ore residue.

As will be recognized by those of ordinary skill in the art, processing steps similar to those depicted in FIG. 2 may be performed on the liquid fractions, or combined liquid fractions, produced by the liquid/solid separation steps of a process of the present invention which utilizes a physical separation step or steps.

As will also be realized by those of ordinary skill in the art, the process of the present invention may also be described as a process for reducing the radioactive metal values present in a metal containing material. As set forth above, an advantage of the process of the present invention is that the process produces a final leached material having an increased concentration of metal values, including tantalum, niobium and/or tin, which are not solubilized in the process; and a reduced concentration of metal values, including a reduced concentration of radioactive metals, which are solubilized in the process. Thus, the present invention includes novel products.

According to the present invention, a leached metal containing product, produced from a starting metal containing material which includes tantalum metal values and niobium metal values comprises:

at least 5%, preferably 6 to 12%, by weight, tantalum at least 5%, preferably 7 to 14%, by weight, niobium; and     no greater than 5%, preferably no greater than 1%, by weight, of the radioactive metal values present in the starting material.

If the starting metal containing material includes niobium and minimal amounts, less than 1%, by weight tantalum, the leached metal containing product comprises:

at least 5%, preferably 7 to 14%, by weight, niobium; and     no greater than 5%, preferably no greater than 1%, by weight, of the radioactive metal values present in the starting material.

Similarly, if the starting metal containing material includes tantalum and minimal amounts, less than 1%, by weight niobium, the ore residue product comprises:

at least 5%, preferably 7 to 14%, by weight, tantalum; and     no greater than 5%, preferably no greater than 1%, by weight, of the radioactive metal values present in the starting material.

The present invention further includes a leached metal containing product, produced from a starting metal containing material, comprising:

at least a 2 times, preferably a 2 to 30 times higher concentration of tantalum, by weight, than the starting material;

at least a 2 times, preferably a 2 to 30 times higher concentration of niobium, by weight, than the starting material; and     no greater than 33%, preferably no greater than 5%, more preferably no greater than 1%, by weight, of the radioactive values present in the starting material.

The tantalum component of thee products of the present invention will generally comprise tantalum oxide ($Ta_2O_5$). Similarly, the niobium component of the products of the present invention will generally comprise niobium oxide ($Nb_2O_5$).

Wherein the starting metal containing material includes tin metal values the present invention provides a leached tin containing product, produced from a starting tin containing material, comprising:

at least a 2 times, preferably a 2 to 30 times higher concentration of tin, by weight, than the starting material; and no greater than 33%, preferably no greater than 5%, more preferably no greater than 1%, by weight, of the radioactive values present in the starting material.

The products of the present invention may be produced by the process of the present invention, which may be advantageously utilized to remove up to 99% of radioactive metal values in a starting metal containing material.

The features and advantages of the process of the present invention are further illustrated by the following examples of certain embodiments of the invention. The following test procedures were utilized in the examples.

Elemental analysis for the majority of the elements which comprised the ore residue, digested residue and leach liquid, was determined by an Inductively Coupled Plasma procedure utilizing a Leeman Model PS 1000 machine, manufactured by Leeman Corporation of Massachusetts and/or by atomic absorption, utilizing a Perkin-Elmer 5000 machine, manufactured by Perkin-Elmer Corporation of Massachusetts, in the manner known to those of ordinary skill in the art.

Fluorine concentration was determined through the use of an ion specific electrode in the manner known to those of ordinary skill in the art.

Sulfate concentration was determined by a gravimetric procedure in the manner known to those of ordinary skill in the art.

Uranium concentration was determined through the use of a fluorometric procedure in the manner known to those of ordinary skill in the art.

Thorium concentration was determined through the use of a colorometric procedure in the manner known to those of ordinary skill in the art.

Alpha (α) and beta (β) radiation levels were determined through the use of a gas flow proportional radiation counter in the manner known to those of ordinary skill in the art.

EXAMPLES 1–16

A series of sixteen (16) laboratory runs was performed on ore residue from a commercial tantalum/niobium production process. The starting ore residue had the following composition (dry basis):

| Element | % |
| --- | --- |
| Ta | 1.21 |
| Nb | 1.23 |
| Ca | 7.92 |
| Al | 5.14 |
| Fe | 6.95 |
| Ti | 0.84 |
| Zr | 2.74 |
| Cr | 0.18 |
| Pb | 0.148 |
| F | 35.3 |

-continued

| Element | % |
| --- | --- |
| $SO_4$ | 1.34 |
| $U_3O_8$ | 0.225 |
| Th | 0.34 |
| Ba | 0.42 |
| Sn | 7.84 |
| Mg | 0.93 |
| Free $H_2O$ | 40 (110° C.) |
| pH | 2.3 |

Gross alpha = 3610 pci/g
Gross beta = 2930 pci/g

An aqueous solution of 10% solids by weight of the ore residue, water, and a mineral acid was formed. The mineral acid utilized in each run with either sulfuric acid, nitric acid or hydrochloric acid. The amount of acid utilized was an amount calculated to provide 2 grams of hydrogen ion ($H^+$) per 100 grams of ore residue solids.

Digestion proceeded for four hours at a temperature of 80–95° C. Runs 1, 2 and 3 were control runs conducted without the use of a complexing agent. In runs 4–14 a complexing agent, either silicon or aluminum, was added to the aqueous solution at the beginning of digestion. The amount of complexing agent added was varied from 0.28 to 1.34 mole of Complexing Agent/mole of Complexed Flouride in Starting Ore Residue.

The experimental conditions set forth above are summarized in the following table:

| Parameter | Experimental Conditions |
| --- | --- |
| Percent Solids, Initial | 10% |
| Temperature, ° C. | 80–95 |
| Digestion Time | 4 hours |
| Acid | $H_2SO_4$; $HNO_3$; or HCl |
| Complexing Agent | None; Al; or Si |
| Complexing Agent Dose | 0.28 to 1.24 M Complex. Agent/M F in Ore Residue |
| Acid level, grams $H^+$/100 g solids | 2 |

The digesting solution was analyzed at 1, 2 and 4 hours for thief (liquid) amount and solids amount and percentage weight loss from the initial starting solids amount was calculated. After four (4) hours of digestion, the filtrate and remaining solids were separated and analyzed.

Addition details of each run, and the results of these analyzes are set forth in the following tables.

TABLE 1

Leach Summary

| Run No. | L-1 | L-2 | L-3 | L-4 | L-5 |
|---|---|---|---|---|---|
| Type | Control $H_2SO_4$ | Control $HNO_3$ | Control HCl | 0.57 $\underline{M}$ Al/HCl | 0.57 $\underline{M}$ Si/HCl |
| Complexing Agent | none | none | none | Al | Si |
| Dry Sludge, g | 30 | 30 | 30 | 30 | 30 |
| Initial Acid Conc., g/l | 109 | 137 | 87 | 100 | 80 |
| Leach Temp., ° C. | 80–90 | 80–90 | 80–90 | 80–90 | 80–90 |
| Initial Percent Solids | 10 | 10 | 10 | 10 | 10 |
| 4-hour Results | | | | | |
| Final, ml | 175 | 175 | 175 | 150 | 175 |
| Solids, g/l | 36 (exclude black solids) | 17 (exclude black solids) | 33 (with black solids) | 26 (with black solids) | 73 (with black solids) |
| Weight Loss, % excluding black solids | 67 (exclude black solids) | 85 (exclude black solids) | — | — | — |
| Weight Loss, % with black solids | 58 (with black solids) | 77 (with black solids) | 70 (with black solids) | 78 (with black solids) | 33.4 (with black solids) |
| Flocculant (Percol 351), dosage, ppm | 25 | 25 | 50 | none | 20 |
| Clarity | Clear supernate | Cloudy supernate | Cloudy | — | Clear |
| Filter Rate | Rapid | Rapid | Rapid | Slow | Slow |
| Wash, Leach Liquor, ml | 40 | 40 | 40 | 40 | 67 |
| No. Displacements | 8 | 8 | 8 | 11 | 6.7 |

| No. | L-6 | L-7 | L-9 | L-10 |
|---|---|---|---|---|
| Type | 0.57 $\underline{M}$ Al/$HNO_3$ | 0.57 $\underline{M}$ Al/$H_2SO_4$ | 0.9 $\underline{M}$ Al/$HNO_3$ | 0.9 $\underline{M}$ Al/HCl |
| Complexing Agent | Al | Al | Al | Al |
| Dry Sludge, g | 30 | 30 | 30 | 30 |
| Initial Acid Conc., g/l | 151 | 133 | 186 | 110 |
| Leach Temp., ° C. | 80–90 | 80–90 | 80–90 | 80–90 |
| Initial Percent Solids | 10 | 10 | 10 | 10 |
| 4-hour Results | | | | |
| Final, ml | 150 | 267 | 250 | 194 |
| Solids, g/l | 36.4 (with black solids) | 56.4 | 42.4 | 36.8 |
| Weight Loss, % with black solids | 70 (with black solids) | 50 | 64.7 | 76.2 |
| Weight Loss, % without black solids | — | — | — | — |
| Flocculant (Percol 351), dosage, ppm | 15 | none | none | none |
| Clarity | Clear | Cloudy | Cloudy | Cloudy |
| Filter Rate | Slow | Fast | Very slow | Very slow |
| Wash, Leach Liquor, ml | 40 | 90 | 133 | 40 |
| No. Displacements | 6.8 | 9 | 18.7 | 8.3 |

| Run No. | L-11 | L-12 | L-13 | L-14 | L-15 |
|---|---|---|---|---|---|
| Type | 0.29 $\underline{M}$ Al/HCl | 0.29 $\underline{M}$ Al/2xHCl | 1.37 $\underline{M}$ Al/HCl | 0.3 $\underline{M}$ Si/$HNO_3$ | 0.9 $\underline{M}$ Al/$HNO_3$ |
| Complexing Agent | Al | Al | Al | Al | Al |
| Dry Sludge, g | 30 | 30 | 30 | 30 | 30 |
| Initial Acid Conc., g/l | 87 | 183 | 134 | 158 | 186 |
| Leach Temp., ° C. | 85–95 | 85–95 | 85–95 | 85–95 | 85–95 |
| Initial Percent Solids | 10 | 10 | 10 | 10 | 10 |
| 4-hour Results | | | | | |
| Final, ml | 243 | 241 | 268 | 347 | — |
| Solids, g/l | 42.7 | 40.7 | — | 25.4 | — |
| Weight Loss, % with black solids | 65.4 | 67.3 | — | 70.6 | 75.1 |
| Weight Loss, % without black solids | — | — | — | — | — |
| Flocculant (Percol 351), dosage, ppm | none | none | none | none | none |
| Clarity | Clear | Clear | Cloudy | Clear | Cloudy |
| Filter Rate | Fast | Fast | Nil | Fast | Very slow |
| Wash, Leach Liquor, ml | 50 | 45 | — | 107 | 3 × 700 CC repul + 100 |
| No. Displacements | 7 | 6.8 | | 18 | |

TABLE 1-continued

Leach Summary

| No. Displacements | | cc wash |
|---|---|---|
| Run No. | L-16 | L-17 |
| Type | 0.9 M Al/HCl | 0.9 M Al/H$_2$SO$_4$ |
| Complexing Agent | Al | Al |
| Dry Sludge, g | 30 | 30 |
| Initial Acid Conc., g/l | 26 | 133 |
| Leach Temp., °C. | 85–95 | 85–95 |
| Initial Percent Solids | 10 | 10 |
| 4-hour Results | | |
| Final, ml | 243 | 241 |
| Solids, g/l | 42.7 | 40.7 |
| Weight Loss, % with black solids | 80.6 | 60.0 |
| Weight Loss, % excluding black solids | — | — |
| Flocculant (Percol 351), dosage, ppm | none | none |
| Clarity | Cloudy | Clear |
| Filter Rate | Slow | Fast |
| Wash, Leach Liquor, ml | 40 | 90 |
| No. Displacements | 8.3 | 9 |

$$M = \frac{\text{Moles of complexing agent}}{\text{Moles fluoride in the starting material}}$$

— = not measured

TABLE 2

Leach Analyses

| | Head % | L-1 F g/l | L-1 S % | L-2 F g/l | L-2 S % | L-3 F g/l | L-3 S % | L-4 F g/l | L-4 S % | L-5 F g/l | L-5 S % | L-6 F g/l | L-6 S % | L-7 F g/l | L-7 S % | L-9 F g/l | L-9 S % | L-10 F g/l | L-10 S % |
|---|---|---|---|---|---|---|---|---|---|---|---|---|---|---|---|---|---|---|---|
| Ta | 1.31 | 1.26 | 0.69 | 1.13 | 1.19 | 0.45 | 0.774 | 0.105 | 0.49 | — | 2.17 | — | 0.504 | — | 1.54 | — | 7.05 | — | 4.83 |
| Nb | 1.36 | 1.49 | 0.23 | 1.33 | 0.43 | 1.21 | 0.49 | 0.13 | 0.58 | — | 0.54 | — | 0.55 | — | 0.83 | — | 7.50 | — | 4.81 |
| Ca | 7.92 | 2.46 | 10.6 | 6.91 | 6.77 | 7.22 | 7.72 | 9.07 | 0.46 | 7.49 | 1.11 | 12.4 | 0.52 | 2.28 | 11.6 | 10.1 | 0.43 | 12.8 | 0.35 |
| Al | 5.14 | 3.32 | 3.75 | 3.86 | 2.64 | 4.57 | 1.89 | 27.6 | 1.39 | 3.74 | 0.35 | 38.3 | 3.61 | 36.2 | 2.84 | 48.0 | 2.47 | 58.5 | 1.58 |
| Fe | 6.95 | 7.17 | — | 6.48 | — | 8.56 | — | 7.55 | — | 6.7 | — | 10.0 | — | 41.7 | 9.71 | 9.05 | — | 10.6 | — |
| Ti | 0.84 | — | — | — | — | — | — | — | — | — | — | — | — | — | — | — | — | — | — |
| Zr | 2.74 | 1.61 | — | 1.83 | — | 1.36 | — | 3.00 | — | 2.15 | — | 4.00 | — | 3.31 | — | 19.4 | — | 3.97 | — |
| Cr | 0.18 | — | — | — | — | — | — | — | — | — | — | — | — | — | — | — | — | — | — |
| Pb | 0.148 | — | — | — | — | — | — | — | — | — | — | — | — | — | — | — | — | — | — |
| F | 35.3 | 28.1 | 24.7 | 28.6 | 23.9 | 34.9 | 23.7 | 38.0 | 4.59 | 35.6 | 6.28 | 51.2 | 12.8 | — | 3.32 | 46.3 | 7.32 | 38.2 | 3.11 |
| So$_4$ | 1.34 | | | | | | | | | | | | | | | | | | |
| Si | — | — | — | — | — | — | — | — | — | 5.37 | 34.4 | 0.29 | 5.48 | — | — | — | — | — | — |
| U$_3$O$_8$ | 0.225 | — | 0.23 | — | 0.406 | — | 0.397 | — | 0.012 | — | 0.13 | — | 0.011 | — | 0.021 | — | 0.009 | — | 0.012 |
| Th | 0.34 | — | 0.91 | — | 1.47 | — | 0.97 | — | 0.09 | — | 0.47 | — | 0.058 | — | 0.065 | — | 0.026 | — | 0.034 |
| Ba | 0.42 | 0.001 | — | 0.353 | — | 0.32 | — | 0.50 | — | 0.284 | — | 0.653 | — | 0.002 | — | — | — | — | — |
| Sn | 7.84 | 0.29 | — | 0.29 | — | 0.37 | — | 0.34 | — | 0.35 | — | 0.36 | — | 0.323 | — | 0.030 | — | 0.41 | 31.6 |
| Mg | 0.93 | 0.62 | — | 0.68 | — | 0.87 | — | 0.98 | — | 0.92 | — | 1.06 | — | 1.42 | — | 1.00 | — | 1.43 | |

| | Head % | L-11 F g/l | L-11 S % | L-12 F g/l | L-12 S % | L-13 F g/l | L-13 S % | L-14 F g/l | L-14 S % | L-15 F g/l | L-15 S % | L-16 F g/l | L-16 S % | L-17 F g/l | L-17 S % |
|---|---|---|---|---|---|---|---|---|---|---|---|---|---|---|---|
| Ta | 1.31 | 0.157 | 4.62 | 0.23 | 4.89 | 0.041 | — | 1.28 | 1.27 | — | — | — | 6.5 | — | 1.09 |
| Nb | 1.36 | 0.936 | 3.12 | 0.94 | 3.31 | 0.017 | — | 1.40 | 0.45 | — | — | — | 5.31 | — | 0.4 |
| Ca | 7.92 | 8.80 | 5.31 | 8.83 | 5.39 | 11.3 | — | 7.07 | 4.28 | — | — | — | — | — | — |
| Al | 5.14 | 20.6 | 5.19 | 21.0 | 5.45 | 4.08 | — | 77.9 | 1.88 | — | 0.43 | — | 0.33 | — | 0.36 |
| Fe | 6.95 | 10.1 | — | 10.1 | — | 7.22 | — | 9.30 | — | — | — | — | — | — | — |
| Ti | 0.84 | — | — | — | — | — | — | — | — | — | — | — | — | — | — |
| Zr | 2.74 | 3.39 | 0.70 | 2.97 | 0.43 | 1.64 | — | 2.04 | 3.48 | — | — | — | — | — | — |
| Cr | 0.18 | — | — | — | — | — | — | — | — | — | — | — | — | — | — |
| Pb | 0.148 | — | — | — | — | — | — | — | — | — | — | — | — | — | — |
| F | 35.3 | 39.1 | 19.8 | 33.3 | 20.9 | — | — | 32.7 | 15.8 | — | — | — | 1.50 | — | 0.56 |
| So$_4$ | 1.34 | | | 2.52 | | 0.03 | | | | | | 0.01 | | | | |
| Si | | — | — | — | — | — | — | — | — | | | | | | |

TABLE 2-continued

Leach Analyses

| | | | | | | | | | | | | | | | | | |
|---|---|---|---|---|---|---|---|---|---|---|---|---|---|---|---|---|---|
| $U_3O_8$ | 0.225 | — | 0.064 | — | 0.060 | — | — | — | 0.23 | — | — | — | 0.0279 | — | 0.0043 | | |
| Th | 0.34 | — | 0.47 | — | 0.037 | — | — | — | — | — | 0.0053 | — | — | — | — | | |
| Ba | 0.42 | 0.53 | 0.21 | 0.53 | 0.103 | 0.56 | — | 0.39 | 0.28 | — | — | — | — | — | — | | |
| Sn | 7.84 | 0.44 | 34.6 | 0.39 | — | — | — | — | — | — | — | — | — | — | — | | |
| Mg | 0.93 | 0.84 | 0.82 | 0.77 | 1.24 | 1.32 | — | 0.74 | — | — | — | — | — | — | — | | |

F = Filtrate
S = Solids
— = not measured

TABLE 3

Summary of Leach Extractions

| Leach | | Extraction % | | | | | | | | | | | | |
|---|---|---|---|---|---|---|---|---|---|---|---|---|---|---|
| No. | Description | Mg | F | Ca | Al | a | β | Ta | Nb | Fe | $U_3O_8$ | Th | Zr | Ba |
| L-1 | $H_2SO_4$ Control | 72 | 76 | 56 | 76 | 29 | 23 | 81 | 94 | 100 | 65 | 12 | 63 | 0.25 |
| L-2 | $HNO_3$ Control | 88 | 90 | 87 | 89 | 64 | 61 | 84 | 95 | 100 | 72 | 32 | 80 | 100 |
| L-3 | HCl Control | 88 | 80 | 70 | 89 | 67 | 32 | 36 | 94 | 100 | 47 | 14 | 47 | 73 |
| L-4 | HCl + 0.57M Al | 100 | 97 | 99 | 94 | 96 | 96 | 9 | 9 | 100 | 98.8 | 94 | 100 | 100 |
| L-5 | HCl + 0.57M Al | 100 | 88 | 91 | 96 | 39 | 48 | 0 | 71 | 100 | 62 | 9 | 91 | 78 |
| L-6 | $HNO_3$ + 0.57M Al | 92 | 89 | 98 | 78[1] | 95 | 96 | 87 | 86 | 100 | 98.5 | 95 | 100 | 100 |
| L-7 | $H_2SO_4$ + 0.57M Al | 100 | 95 | 27 | 72[1] | 42 | 37 | 36 | 66 | 100 | 95.3 | 4 | 100 | 0.4 |
| L-9 | $HNO_3$ + 0.9M Al | 89 | 93 | 98 | 83[1] | 92 | 98.5 | 0 | 0 | 82 | 98.6 | 97 | — | — |
| L-10 | HCl + 0.9M Al | 100 | 98 | 99 | 93[1] | 97.4 | 97.6 | 4 | 7 | 100 | 98.8 | 98 | 94 | — |
| L-11 | HCl + 0.28M Al | 73 | 80 | 77 | 66 | 49 | 53 | 10.5 | 61.5 | 100 | 90.3 | 52 | 91 | 83 |
| L-12 | 2 × HCl + 0.28M Al | 66 | 80 | 78 | 66 | 68 | 72 | 15.4 | 61.5 | 100 | 91.3 | 64.4 | 95 | 92 |
| L-13 | HCl + 1.34M Al | 100 | — | 100 | 71[1] | — | — | 3 | 1.3 | 92 | — | — | 53 | 100 |
| L-14 | $HNO_3$ + 0.28M Si | 92 | 87 | 84 | 89 | 11 | 12 | 100 | 100 | 100 | 70 | — | 64 | 80 |
| L-15 | $HNO_3$ + 0.9M Al | — | — | — | 98.1 | 93.0 | 98.4 | — | — | — | — | 99 | — | — |
| L-16 | HCl + 0.9M Al | — | 99.3 | — | — | 95.8 | 98.8 | 2.6 | 22.5 | — | 98 | 98.7 | — | — |
| L-17 | $H_2SO_4$ + 0.9M Al | — | 99.4 | — | — | 32 | 53 | 66 | 88 | — | 99.3 | 97.3 | — | — |

[1]Insufficient wash - slow filtration
— = not measured

These results indicate the process of the present invention may be utilized to solubilize metal values, that are otherwise difficult to solubilize, from an ore residue. In addition, these results illustrate that a concentrate comprising tantalum, niobium and/or tin may be formed. See, for example, runs L-10 and L-11 where a tin/tantalum concentrate comprising greater than 30% tin is produced.

Figure 3:
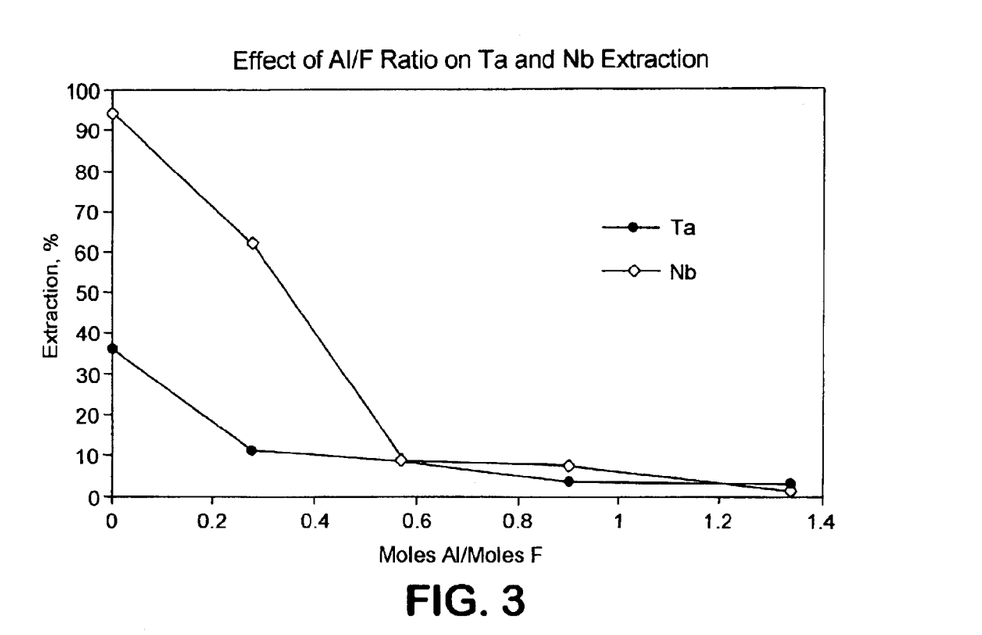
FIG. 3 is a graph depicting the effect of (Aluminum (Al) ion/Fluoride (F) ion) ratio on the extraction of tantalum and niobium for the example runs described below.
Figure 4:
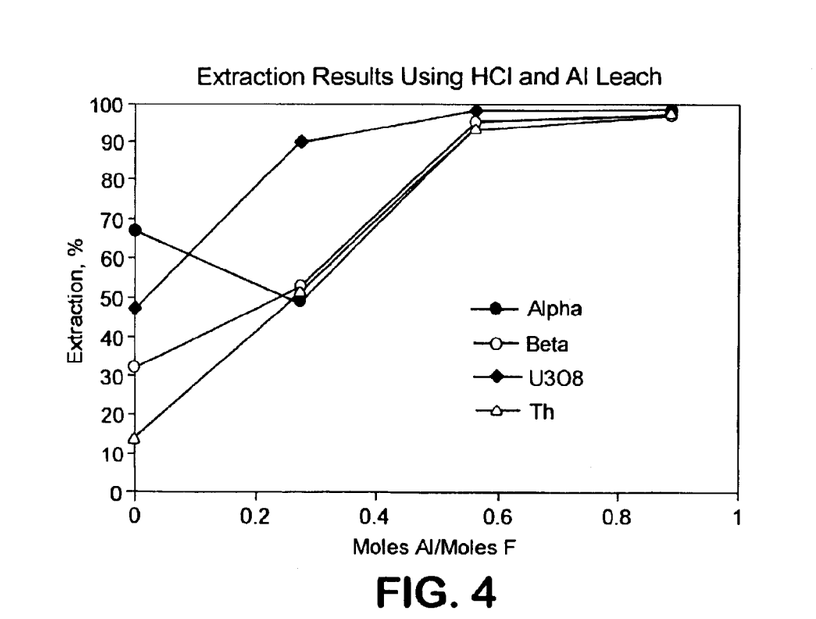
FIG. 4 is a graph depicting the extraction of radioactive elements for example runs of the present invention utilizing hydrochloric acid as the mineral acid and aluminum as the complexing agent and described below.

FIG. 3 is a graph depicting the effect of (Al ion/F ion) ratio on the extraction of tantalum and niobium for the example runs. As shown in FIG. 4, at (Al ion/F ion) ratios of 0.3 or greater tantalum extraction is suppressed and at (Al ion/F ion) ratios of 0.57 or greater niobium extraction is suppressed. Suppressing the extraction of these elements results in their being concentrated in the solid phase, which can be further processed to allow their recovery.

FIG. 4 is a graph depicting the extraction of radioactive elements for example runs of the present invention utilizing hydrochloric acid as the mineral acid and aluminum as the complexing agent. As shown in FIG. 5, at (Al ion/F ion) ratios of 0.57 or greater substantially all of the radioactive element values are extracted (solubilized).

It should be clearly understood that the forms of the present invention herein described are illustrative only and are not intended to limit the scope of the invention.

What is claimed is:

1. A process for solubilizing tantalum and/or niobium metal values from a metal containing material comprising fluoridated tantalum and/or niobium metal values the process comprising:
    contacting the metal containing material with an aqueous solution of mineral acid and a complexing agent, capable of providing an aluminum, silicon, titanium complexing ion or mixtures thereof, to form a solution digesting the metal containing material under temperature and pressure conditions suitable to:
        solubilize at least a portion of a fluoridated tantalum and/or niobium metal value to generate fluorine ions and tantalum or niobium metal values;

and form a complex comprising a fluorine ion and complexing ion; and separating the tantalum and/or niobium metal values from the solution.

2. The process of claim 1 wherein the metal containing material, acid and complexing agent are suspended in water at a range of 5 to 40% solids and the digesting solution is agitated in an amount sufficient to maintain substantially all of the solids in suspension.

3. The process of claim 1 wherein the digesting solution is maintained at a temperature of 40 to 100° C. for a time period of 0.25 hours to 4.0 hours.

4. The process of claim 1 wherein the mineral acid comprises nitric acid ($HNO_3$), sulfuric acid ($H_2SO_4$, hydrochloric acid (HCl) and/or mixtures thereof.

5. The process of claim 1 wherein the complexing agent consists essentially of aluminum, silicon and/or mixtures thereof.

6. The process of claim 5 wherein the amount of complexing agent utilized is an amount such that the molar amount of complexing agent is related to the molar content of the starting material according to the following formula:

$$\frac{\text{Moles of complexing agent}}{\text{Moles fluoride in the starting material}} = 0.2 \text{ to } 1.5.$$

7. The process of claim 6 wherein the amount of acid utilized is an amount such that the amount of hydrogen ion supplied by the acid is sufficient to react with the combined oxygen in the system after addition of the complexing agent.

8. The process of claim 7 wherein 0.1 to 2.0 lbs. of acid are utilized per pound of dried starting material.

9. A process for solubilizing tantalum and/or niobium metal values from a metal containing material comprising fluoridated tantalum and/or niobium metal values the process comprising:

forming a solution by contacting the metal containing material with an aqueous solution of mineral acid and a complexing agent, capable of providing an aluminum, silicon, titanium complexing ion or mixtures thereof, in an amount of 0.1 pound to 2.0 pounds mineral acid per pound of metal containing material such that the amount of hydrogen ion supplied to the system by the mineral acid is sufficient to react with oxygen released by the decomposition of the complexing agent;

digesting the solution at a temperature of 40 to 110° C., at ambient pressure, for 0.25 to 4.0 hours, in a range of 5 to 40% solids to:

digest the metal containing material;

solubilize at least a portion of a fluoridated tantalum and/or niobium metal value to generate fluorine ions and tantalum or niobium metal values;

form a complex comprising a fluorine ion and a complexing ion and separating the tantalum and/or niobium metal values from the solution.

10. The process of claim 9 wherein the metal containing material, acid and complexing agent are agitated in an amount sufficient to maintain substantially all of the solids in suspension.

11. The process of claim 9 wherein the mineral acid comprises nitric acid ($HNO_3$), sulfuric acid ($H_2SO_4$), hydrochloric acid (HCl) and/or mixtures thereof.

12. The process of claim 9 wherein the complexing agent consists essentially of aluminum, silicon and/or mixtures thereof.

13. The process of claim 12 wherein the amount of complexing agent utilized is an amount such that the molar amount of complexing agent is related to the molar content of the starting material according to the following formula:

$$\frac{\text{Moles of complexing agent}}{\text{Moles fluoride in the starting material}} = 0.2 \text{ to } 1.5.$$

* * * * *